United States Patent
Yu

(10) Patent No.: US 7,549,150 B2
(45) Date of Patent: Jun. 16, 2009

(54) METHOD AND SYSTEM FOR DETECTING POTENTIAL RACES IN MULTITHREADED PROGRAMS

(75) Inventor: Yuan Yu, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 932 days.

(21) Appl. No.: 10/808,110

(22) Filed: Mar. 24, 2004

(65) Prior Publication Data

US 2005/0216798 A1    Sep. 29, 2005

(51) Int. Cl.
 *G06F 9/46* (2006.01)
(52) U.S. Cl. ..................................... 718/108
(58) Field of Classification Search ................. 718/108
 See application file for complete search history.

(56) References Cited

U.S. PATENT DOCUMENTS

| | | | |
|---|---|---|---|
| 5,161,227 A | | 11/1992 | Dias et al. |
| 5,193,180 A | * | 3/1993 | Hastings .................... 717/163 |
| 5,440,743 A | | 8/1995 | Yokota et al. ............... 395/650 |
| 6,405,326 B1 | | 6/2002 | Azagury et al. |
| 6,546,443 B1 | | 4/2003 | Kakivaya et al. |
| 6,920,634 B1 | * | 7/2005 | Tudor ........................ 718/107 |
| 2003/0236951 A1 | | 12/2003 | Choi et al. .................. 711/150 |

FOREIGN PATENT DOCUMENTS

EP    0 864 975 A2    9/1998

OTHER PUBLICATIONS

A Comparative Analysis of Fine-Grain Threads Packages G. Price and D. Lowenthal Journal of Parallel and Distributed Computing May 30, 2001.*

Pozniansky, E. et al., "Efficient on-the-Fly Data Race Detection in Multithreaded C++ Programs", *Proceedings of the Ninth ACM Sigplan Symposium on Principles and Practice of Parallel Programming*, 2003, 179-190, XP-002434257.

Praun, Christoh von, et al., "Object Race Detection", *ACM 2001*, pp. 70-82.

Schonberg. *On-The-Fly Detection of Access Anomalies*. ACM SIGPLAN Notices, vol. 24, No. 7, pp. 285-297. New York: ACM Press, Jul. 1989.

Dinning et al. *Detecting Access Anomalies in Programs with Critical Sections*. In Proceedings of the 1991 ACM/ONR Workshop on Parallel and Distributed Debugging, pp. 85-96. New York: ACM Press, 1991.

(Continued)

*Primary Examiner*—Meng-Ai An
*Assistant Examiner*—Mengyao Zhe
(74) *Attorney, Agent, or Firm*—Woodcock Washburn LLP

(57) ABSTRACT

A dynamic race detection system and method overcomes drawbacks of previous lockset approaches, which may produce many false positives, particularly in the context of thread fork/join and asynchronous calls. For each shared memory location, a set of locks that are protecting the location and a set of concurrent thread segments that are accessing the location are maintained. To maintain these sets, each thread maintains a set of locks it is currently holding and a set of thread segments ordered before its current thread segment. Each thread also maintains a virtual clock that is incremented when it forks a second thread. A thread segment is a pair comprising a thread identifier and a virtual clock value. A data race is reported when the lockset for a particular shared memory location is empty and the cardinality of the set of concurrent threads for that memory location is greater than one.

6 Claims, 9 Drawing Sheets

OTHER PUBLICATIONS

Von Praun et al. *Object Race Detection*. ACM SIGPLAN Notices, vol. 36, No. 11, pp. 70-82. New York: ACM Press, Oct. 2001.

Choi et al. *Efficient and Precise Datarace Detection for Multithreaded Object-Oriented Programs*. ACM SIGPLAN Notices, vol. 37, No. 5, pp. 258-269. New York: ACM Press, May 2002.

Engler et al. *RacerX: Effective, Static Detection of Race Conditions and Deadlocks*. In Proceedings of the 19th ACM Symposium on Operating Systems Principles, pp. 237-252. New York: ACM Press, 2003.

U.S. Appl. No. 09/867,362, filed May 29, 2001, Stoodley et al.

U.S. Appl. No. 10/032,567, filed Jan. 2, 2002, Choi et al.

U.S. Appl. No. 10/035,422, filed Jan. 4, 2002, Ur et al.

U.S. Appl. No. 10/178,561, filed Jun. 25, 2002, Choi et al.

Lamport, *Time, Clocks, and the Ordering of Events in a Distributed System*. Communications of the ACM, vol. 21, No. 7, pp. 558-565. New York: ACM Press, Jul. 1978.

Savage et al. *Eraser: A Dynamic Data Race Detector for Multithreaded Programs*. ACM Transactions on Computer Systems, vol. 15, No. 4, pp. 391-411. New York: ACM Press, Nov. 1997.

* cited by examiner

METHOD AND SYSTEM FOR DETECTING POTENTIAL RACES IN MULTITHREADED PROGRAMS

TECHNICAL FIELD OF THE INVENTION

The present invention relates generally to computer systems, and more particularly to detecting race conditions in multithreaded computer programs.

BACKGROUND OF THE INVENTION

It has become common for computer software developers to write programs making use of multiple threads of execution. Modern operating systems and programming languages support threads, and many large commercial applications are multithreaded. Threads are especially useful for implementing multiple asynchronous computations within an operating system process. Event-driven applications, for example, often employ multithreading.

The very features that make multithreading a useful programming technique also make debugging multithreaded programs a very difficult task, however. Multiple threads can interact in nondeterministic and timing-dependent ways. Typically such threads share data, requiring synchronization of their interaction to ensure program correctness, independent of how threads are scheduled or how their instruction streams are interleaved.

It is particularly difficult for programmers to detect errors in thread synchronization that are associated with race conditions. In a multithreaded program, a data race condition occurs when a shared memory location is accessed by two or more concurrent threads, with at least one of the accesses being a write, without proper synchronization to constrain the ordering of the accesses. The effects of the execution in such a case depend on the particular order in which the accesses take place. Race conditions often result in unexpected and undesirable program behavior, such as program crashes or incorrect results. Such nondeterminacy is also precisely why it is so difficult to detect race conditions using conventional debugging techniques.

Given the potentially detrimental effects of race conditions and the difficulty of debugging programs that contain them, automated tools for detecting the presence of race conditions should be of great value to developers of multithreaded programs. Effective and efficient tools have been lacking, however. With respect to dynamic race detection, in which an attempt is made to detect potential races in a particular execution of a program, two approaches have been widely used: the Lamport "happens-before" order and the lockset technique, which are described further in the detailed description below. The former typically has very unsatisfactory runtime overhead, especially for programs written in object-oriented languages like C# and Java, while the latter approach often produces an unacceptable number of false positives, particularly in programs using asynchronous delegates.

SUMMARY OF THE INVENTION

The following presents a simplified summary of some embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in simplified form as a prelude to the more detailed description that is presented below.

In accordance with one embodiment of the invention, a system for dynamic race detection is provided. The system includes a mechanism for maintaining a set of concurrent thread segments that access a shared memory location; a mechanism for maintaining, with respect to a running thread, a set of thread segments that are ordered before its current thread segment; a mechanism for maintaining a first set of locks associated with a shared memory location; a mechanism for maintaining a second set of locks associated with a thread that acquires and releases the locks in the second set of locks; and a mechanism for reporting a detected race condition.

In accordance with another embodiment, a method for dynamic race detection is provided. The method includes (a) maintaining a first set of locks associated with a shared memory location; (b) maintaining a second set of locks associated with a thread that acquires and releases the locks in the second set of locks; (c) maintaining a set of concurrent thread segments that access a shared memory location; and (d) maintaining, with respect to a thread, a set of thread segments that are ordered before the current segment of the thread.

Both the set of concurrent thread segments that access a shared memory location and the set of thread segments that are ordered before a thread may be represented as a set of ordered pairs, wherein one member of a pair in the set of ordered pairs is a thread identifier, and the other member of a pair is a virtual clock value identifying a thread segment of the first member.

Each thread maintains a virtual clock that is initialized to zero at the thread creation and is incremented by one whenever the thread forks another thread. When a thread forks a second thread, the set of thread segments that are ordered before the second thread is computed as the set union of (i) the set of thread segments that are ordered before the first thread and (ii) a singleton set comprising the thread segment of the first thread at which the second thread is forked. In one embodiment, the virtual clock associated with the first thread is incremented by one, and the virtual clock associated with the forked thread is initialized to zero. When a thread performs a join operation on a second thread, the set of thread segments that are ordered before the first thread is computed as the union of (i) the set of thread segments that are ordered before the first thread, (ii) a subset of the set of thread segments that are ordered before the second thread wherein, for each thread segment in the subset, the thread identifier of the thread segment is not equal to the thread identifier of the first thread, and (iii) the singleton set containing the current thread segment of the second thread.

If a thread accesses a shared memory location, the set of concurrent thread segments accessing the location is updated by removing thread segments that are no longer concurrently accessing the location, and adding the current thread segment of the thread. If the new set of concurrent thread segments contains no more than one element, then the set of locks associated with the shared memory location is updated to the set of locks associated with the thread, and otherwise is updated to the intersection of the set of locks associated with the shared memory location and the set of locks associated with the thread. If the set of concurrent thread segments has more than one element, and the set of locks associated with the shared memory location is empty, a warning of a potential race condition is reported.

In accordance with another embodiment, a dynamic race detection system and method are provided. In a runtime system, calls to a race detector are emitted when code in the form of a common intermediate language is loaded and compiled in the execution engine. The data structure for storing instrumentation information needed for a memory object is allocated together with the object by the memory allocation mechanism of the runtime system.

Other features of the invention will become apparent from the following detailed description when taken in conjunction with the drawings, in which:

DETAILED DESCRIPTION

In the following description, various embodiments of the present invention will be described. For purposes of explanation, specific configurations and details are set forth in order to provide a thorough understanding of the embodiments. However, it will also be apparent to those having skill in the art that the present invention may be practiced without the specific details. Furthermore, well-known features may be omitted or simplified in order not to obscure the embodiment being described.

Before proceeding with a description of the invention, the happens-before and lockset approaches in the prior art, mentioned in the background section above, will be described in some detail in order to elucidate the novelty and utility of the present invention. In the happens-before approach, a partial order of all events associated with all threads in a concurrent execution is created. The order is based on the relation described in Lamport, "Time, Clocks, and the Ordering of Events in a Distributed System," 21 Commun. ACM 558-565 (1978), incorporated herein by reference. Within a single thread, events are ordered in the order in which they occur. Between threads, events are ordered according to the properties of the locks or other synchronization objects that are acquired and released by the threads. If one thread accesses a lock, and the next access of the lock is by a different thread, the first access is defined to "happen before" the second if the semantics of the lock prevent a schedule in which the two events are exchanged in time. A race is deemed to have occurred if two threads access a shared memory location and the accesses are causally unordered.

As a simple illustration of the happens-before approach, consider two concurrent threads $t_1$ and $t_2$, each of which executes the following code fragment:

| | |
|---|---|
| acquire (l); | // Acquire lock l |
| write x; | // Write shared location x |
| release (l); | // Release lock l |

Figure 1:
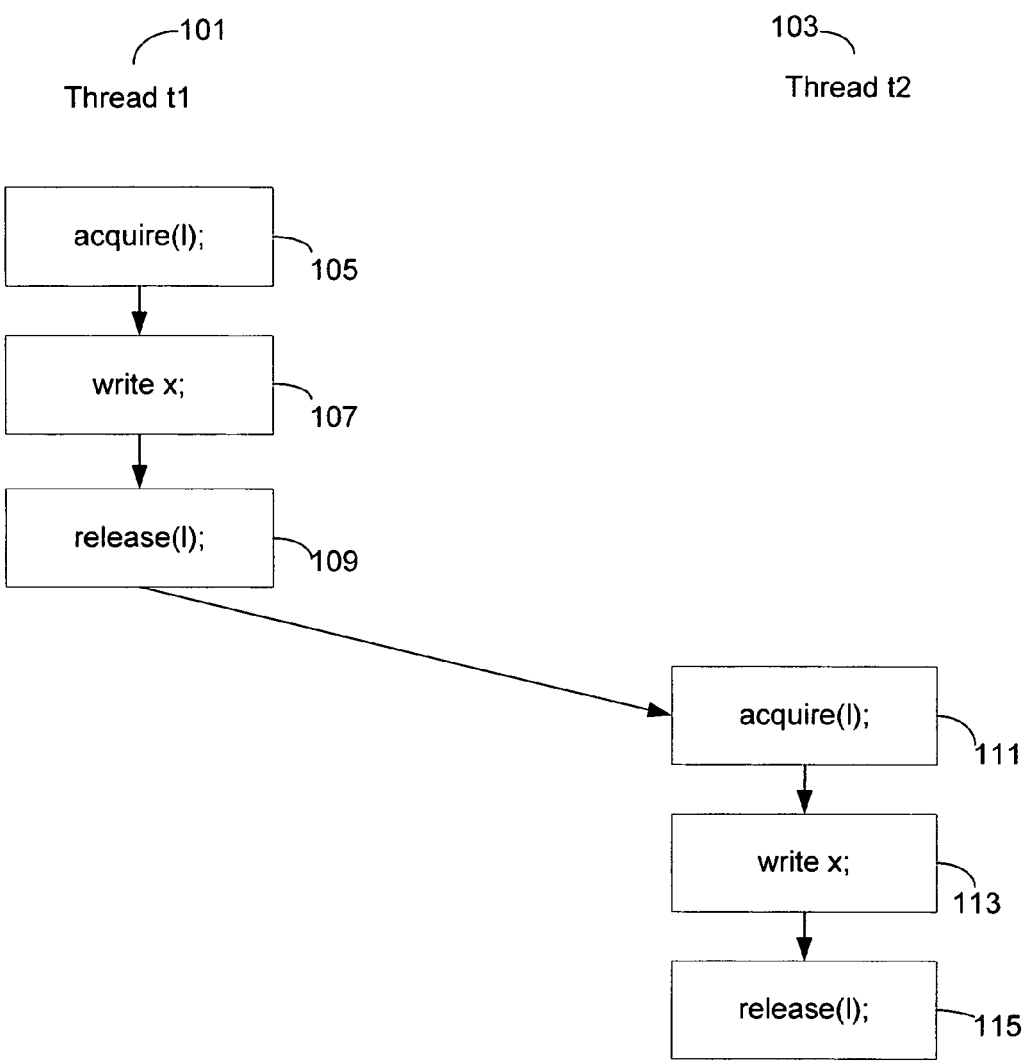
FIG. 1 is a diagram representing a happens-before order of events associated with two concurrent threads in accordance with the prior art.

FIG. 1 shows a possible ordering of the events associated with the two threads $t_1$ 101 and $t_2$ 103. The three program statements 105, 107, 109 executed by $t_1$ 101 are ordered by happens-before because they are executed sequentially in the same thread. The acquire of lock l by $t_2$ 103 is ordered by happens-before with the release of lock l by $t_1$ 101 because a particular lock cannot be acquired before it is released by its previous holder. Finally, the three statements 111, 113, 115 executed by $t_2$ 103 are ordered by happens-before because they are executed sequentially within that thread.

Lockset-based detection is described in a number of references, such as Savage et al., "Eraser: A Dynamic Data Race Detector for Multithreaded Programs," 15 ACM Trans. Comp. Sys. 391-411 (1997), incorporated herein by reference. In a simple lockset approach, for each shared location x, a set $S_x$ of locks that protect x is maintained for the computation by monitoring all reads and writes to x as the program executes. For each thread t, a set $S_t$ of locks held by t is maintained by monitoring lock acquisitions of the thread t.

Figure 2A:
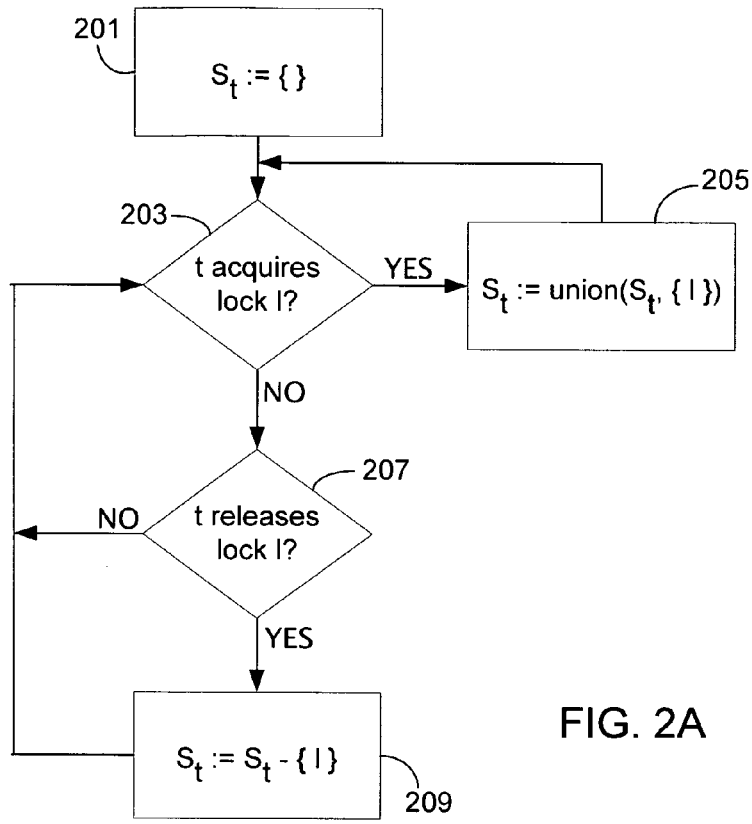
FIG. 2A is a flowchart illustrating the maintenance of the lockset associated with a thread in accordance with the prior art.
Figure 2B:
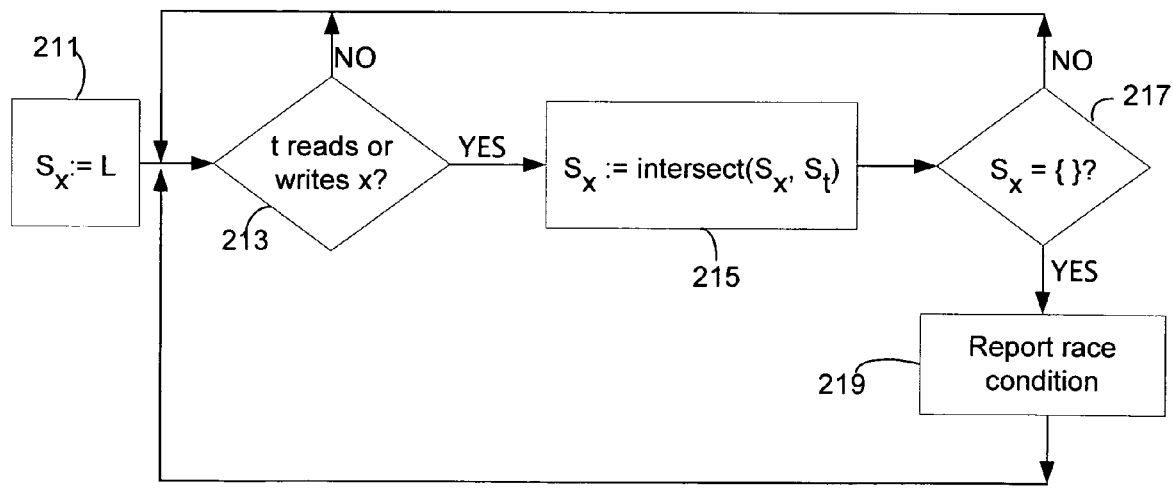
FIG. 2B is a flowchart illustrating the maintenance of the lockset associated with a shared memory location in accordance with the prior art.

The flow diagrams of FIGS. 2A and 2B illustrate how the sets $S_t$ and $S_x$, respectively, are maintained under the lockset approach. Turning to FIG. 2A, at step 201, $S_t$ is initially empty when the thread t is created. At step 203, it is determined whether the thread t acquires a lock l. If so, at step 205 $S_t$ is updated by taking the union of $S_t$ and the singleton set containing l. Similarly, at step 207, it is determined whether the thread releases a lock l. If so, at step 209 $S_t$ is updated by taking the set difference of $S_t$ and the singleton set containing l, thus removing l from the set of locks held by thread t. Turning now to FIG. 2B, at step 211, initially $S_x$ is L, the set of all possible locks. At step 213, it is determined whether the thread t performs a read or write operation on location x. If so, at step 215 $S_x$ is updated to the set comprising the intersection of $S_x$ and $S_t$. At step 217, it is determined whether $S_x$ is empty. If so, at step 219 a warning regarding a potential race condition is reported.

Figure 3:
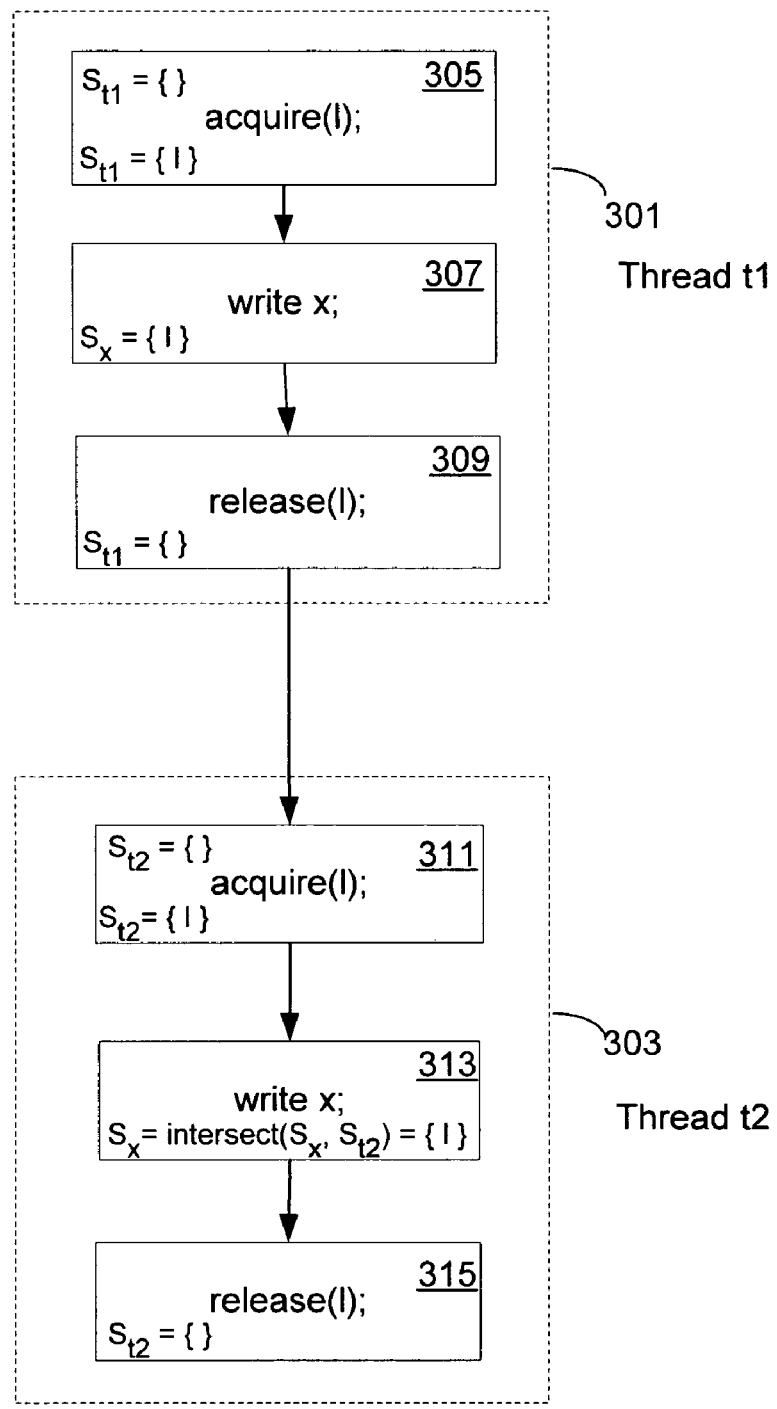
FIG. 3 is a diagram illustrating the operation of the lockset approach on an example with no race condition in accordance with the prior art.

FIG. 3 illustrates a simple example of the operation of the lockset approach, using the same exemplary concurrent threads $t_1$ and $t_2$ as in FIG. 1. Suppose that threads $t_1$ and $t_2$ execute their respective statements in the following order:

| | $t_1$ | | $t_2$ |
|---|---|---|---|
| 1 | acquire (l); | 4 | acquire (l); |
| 2 | write x; | 5 | write x; |
| 3 | release (l); | 6 | release (l); |

That is, thread $t_1$ executes its three statements before thread $t_2$ executes its three statements. We also assume that $S_{t_1}$ and $S_{t_2}$ are empty and $S_x$ is L at the start of the execution.

Turning now to FIG. 3, the flow diagram represents the sequence of statements executed by threads $t_1$ 301 and $t_2$ 303. Block 305 shows that initially $S_{t_1}$ is empty and after $t_1$ 301 acquires lock l, $S_{t_1}$ becomes the set containing l. In block 307, $t_1$ 301 executes the write of x, following which $S_x$ also becomes the set containing l. In block 309, $t_1$ 301 releases the lock l, and $S_{t_1}$ again becomes the empty set. Now thread $t_1$ 301 has ended its execution and thread $t_2$ 303 begins. Block 311 shows that initially $S_{t_2}$ is empty, and after $t_2$ 303 acquires lock l, $S_{t_2}$ becomes the set containing l. In block 313, $t_2$ 303 writes location x, following which $S_x$ becomes the set formed by the intersection of $S_x$ and $S_{t_2}$. Since both sets are now the singleton set containing l, $S_x$ remains the set containing l. In block 315, $t_2$ 303 releases the lock l, and $S_{t_2}$ again is empty. During the execution of threads $t_1$ 301 and $t_2$ 302, $S_x$ is never empty, so the lockset method does not report any race condition. Indeed, the lack of a race condition intuitively follows from the fact that a single lock l is used to protect x in both threads.

Figure 4:
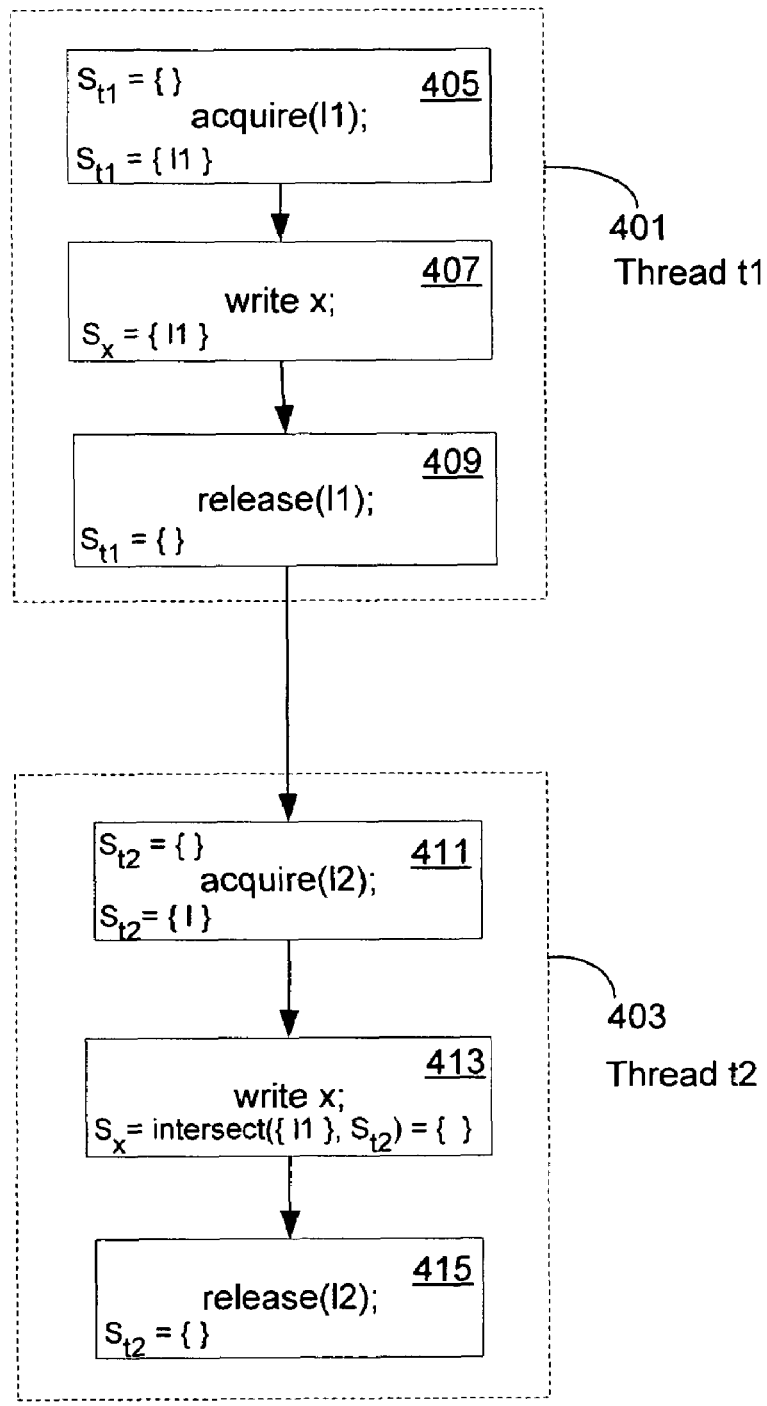
FIG. 4 is a diagram illustrating the operation of the lockset approach on an example with a correctly-reported race condition in accordance with the prior art.

FIG. 4 provides a second example of the operation of the lockset approach. Here thread $t_1$ 401 and thread $t_2$ 403 use different locks, $l_1$ and $l_2$ respectively, unlike the previous example in which x was protected by the same lock in both threads. Block 405 shows that initially $S_{t_1}$ is empty, and after $t_1$ 401 acquires lock $l_1$, $S_{t_1}$ becomes the set containing $l_1$. In block 407, $t_1$ 401 executes the write of x, following which $S_x$ also becomes the set containing $l_1$. In block 409, $t_1$ 301 releases the lock $l_1$, and $S_{t_1}$ again becomes the empty set. Now thread $t_1$ 401 has ended its execution and thread $t_2$ 403 begins. Block 411 shows that initially $S_{t_2}$ is empty, and after $t_2$ 403 acquires lock $l_2$, $S_{t_2}$ becomes the set containing $l_2$. In block 413, $t_2$ 403 writes location x, following which $S_x$ becomes the set formed by the intersection of $S_x$ and $S_{t_2}$. $S_x$ is the set containing $l_1$, and $S_{t_2}$ is the set containing $l_2$, so their intersection is the empty set. Since $S_x$ is empty, a race condition is reported at this point during the execution. In block 415, $t_2$ 403 releases the lock $l_2$, and $S_{t_2}$ again is empty.

Figure 5:
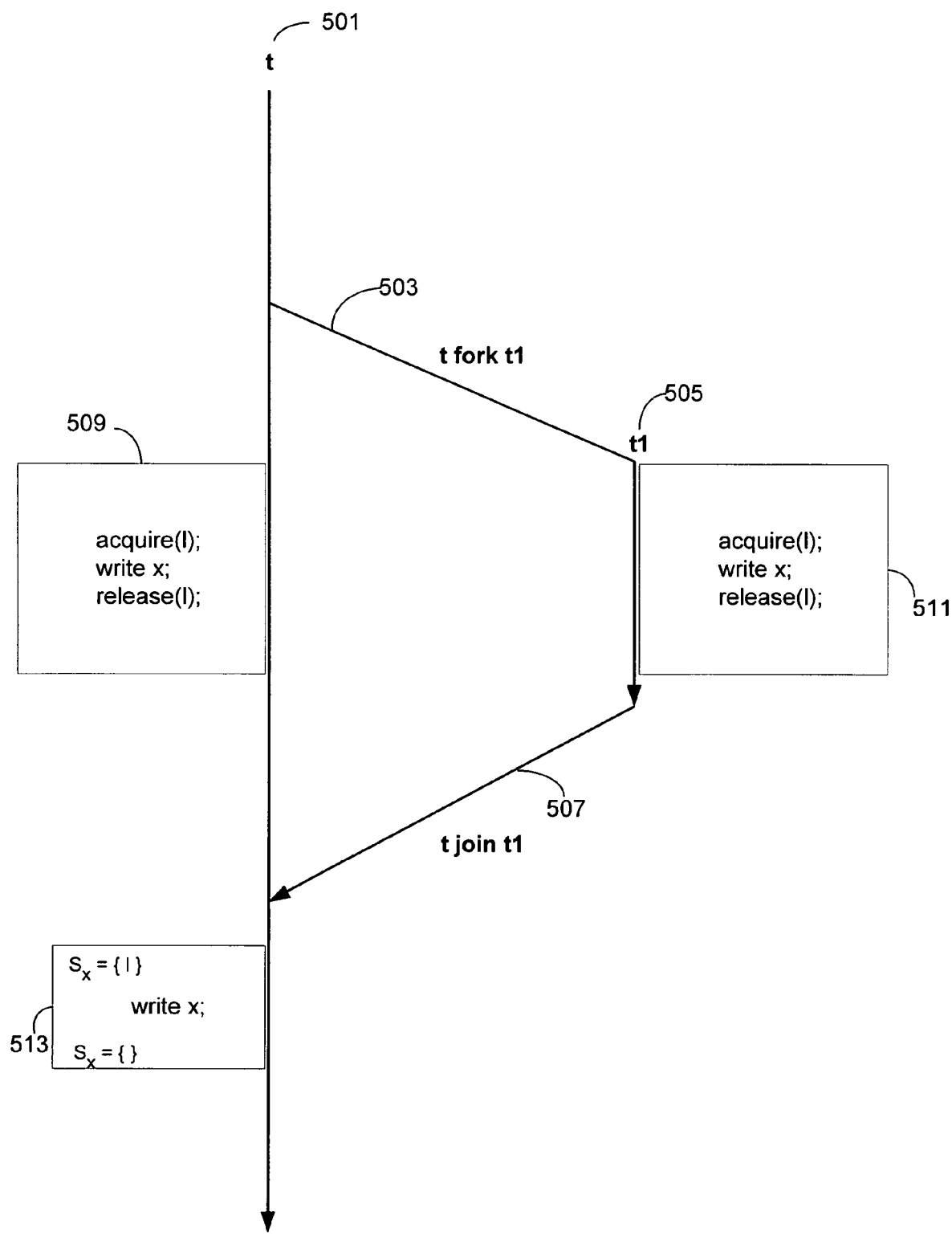
FIG. 5 is a diagram representing the operation of a thread performing a fork and join, giving rise to a false positive under the lockset approach in accordance with the prior art.

While tools implementing the lockset approach do not generally have the poor performance associated with approaches that use the happens-before relation, such tools are known to produce many false positives, reporting race conditions for race-free programs. The most common class of false positives comprise those which arise when threads make fork and join (wait) system calls. An example is shown in FIG. 5. Let us assume that there is only one thread t at the start of the execution. The vertical line 501 represents the execution of thread t. The diagonal line 503 extending from the line 501 represents t forking a new thread $t_1$. The vertical line 505 represents the execution of thread $t_1$. After the fork, there are now two threads, t and $t_1$, executing concurrently. The diagonal line 507 extending towards the line 501 represents thread t joining thread $t_1$: that is, thread t waits for $t_1$ to complete execution.

The fork 503 and join 507 implicitly impose an ordering on the events in threads t 501 and $t_1$ 505. In block 509, thread t executes a write of x, with an acquire and release of a lock l. In block 511, thread $t_1$ executes the same statements. The two accesses of x do not give rise to a race condition, because they are protected by the same lock l. At block 513, thread t executes a write of x. At this point thread t can write x without having to use a lock, and without having to use the same lock used to protect x in the execution by thread $t_2$. As indicated in block 513, however, before the write of x, $S_x$ is the set containing l. After the write of x, $S_x$ becomes empty. Because $S_x$ is empty, the lockset procedure reports a race, even though there clearly is no race, for only a single thread is being executed and there is no need to protect x from access.

The present invention extends the lockset approach to eliminate its tendency to report false positives in the fork and join context. In addition to recording the per-thread and per-location locksets as in the lockset approach, the invention maintains two further sets. One set is the set $T_x$, comprising the set of concurrent thread segments accessing the shared memory location x. A race is reported when the relevant lockset is empty and the cardinality of $T_x$ is greater than 1. The second new set is the set $B_t$, comprising the set of thread segments ordered before the current thread segment of t. In one embodiment, both $T_x$ and $B_t$ are represented as the set of tuples $\{<t_1, c_1>, \ldots, <t_n, c_n>\}$. The ordering relies on the use of a virtual clock $C_t$ for each thread t. A tuple $<t, c>$ represents the thread segment of thread t at the virtual clock time of c.

Figure 6:
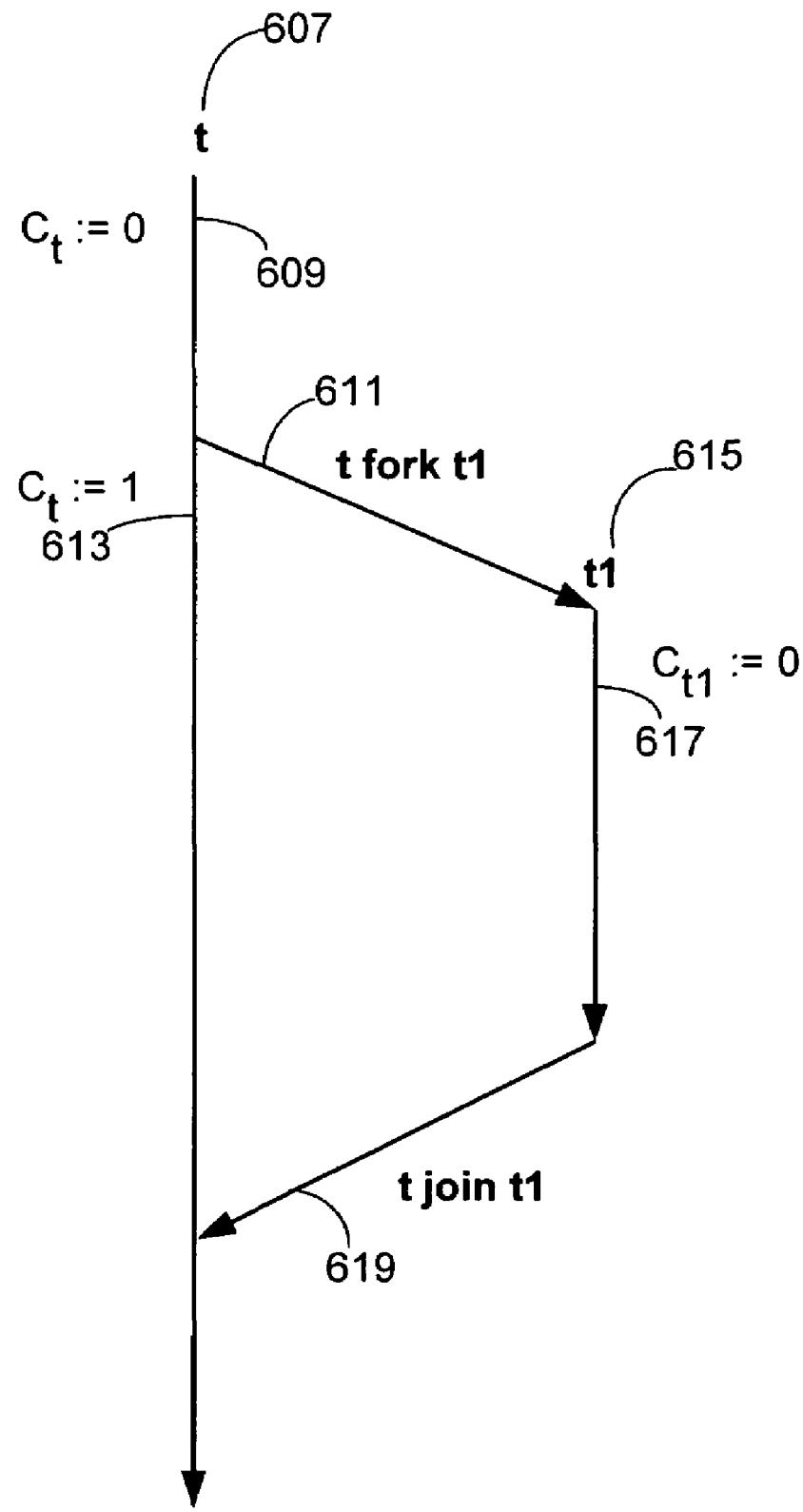
FIG. 6 is a diagram representing the operation of a thread performing a fork and join, illustrating the maintenance of the thread's virtual clock in accordance with an embodiment of the invention.

FIG. 6 is a diagram representing a fork and join, illustrating the manner in which virtual clocks are maintained for each thread in an embodiment of the invention. The vertical line 607 represents the execution of thread t. Let us assume that the virtual clock for t is initially 0 (at the point designated 609). The diagonal line 611 represents t forking the thread $t_1$. At this point on the execution line 607 for thread t (designated 613), the virtual clock for t is incremented by 1. The vertical line 615 represents the execution of the forked thread $t_1$. The virtual clock for thread $t_1$ is initialized to 0 (at the point designated 617). The diagonal line 619 represents t's join of $t_1$.

Figure 7A:
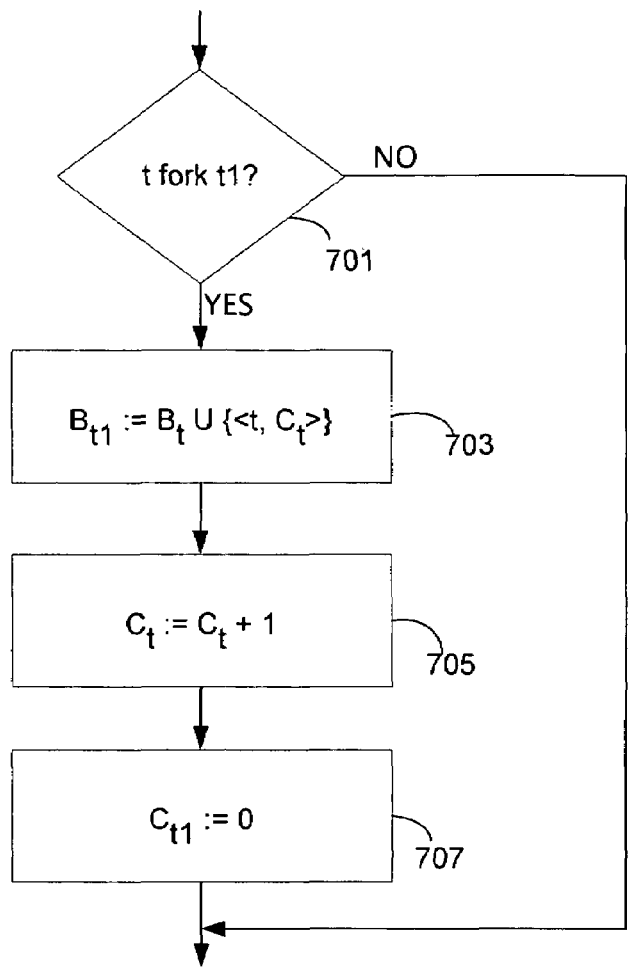
FIG. 7A is a flowchart showing steps associated with a fork call in accordance with an embodiment of the invention.
Figure 7B:
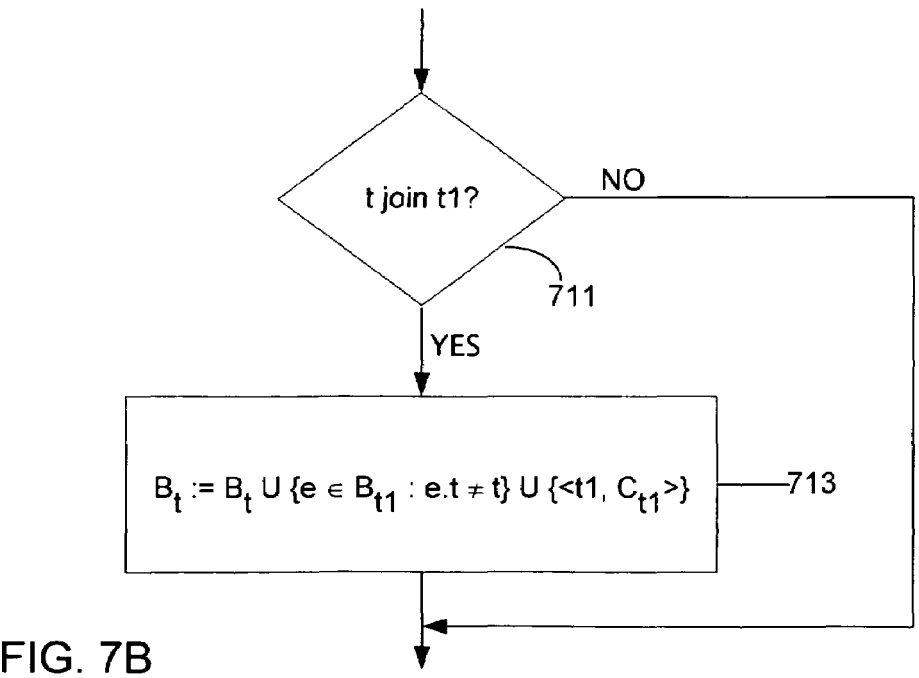
FIG. 7B is a flowchart showing steps associated with a join call in accordance with an embodiment of the invention.

The flowchart of FIG. 7A shows steps associated with the fork of a new concurrent thread $t_1$ by a thread t. At step 703, it is determined whether thread t forks thread $t_1$. If so, the following operations are performed. At step 703 the set $B_{t_1}$, the set of thread segments ordered before thread $t_1$, is computed as the union of the corresponding set for thread t and the singleton set comprising the thread segment $<t, C_t>$. At step 705 the virtual clock for thread t is incremented by 1. At step 707 the virtual clock for the newly forked thread $t_1$ is initialized to 0. The flowchart of FIG. 7B shows steps associated with the join by thread t. At step 711, it is determined whether thread t makes the join call, waiting for thread $t_1$ to complete execution. If so, at step 713, the new value of $B_t$ is computed as the union of the following three sets: (i) $B_t$, (ii) the set of thread segments in set $B_{t_1}$ that do not belong to the current thread t, and (iii) the singleton set containing the current thread segment of $t_1$.

The steps illustrated in FIG. 2A and discussed above, regarding the maintenance of the set $S_t$ as locks are acquired and released, are also used in the present invention and need not be described further here.

Figure 8:
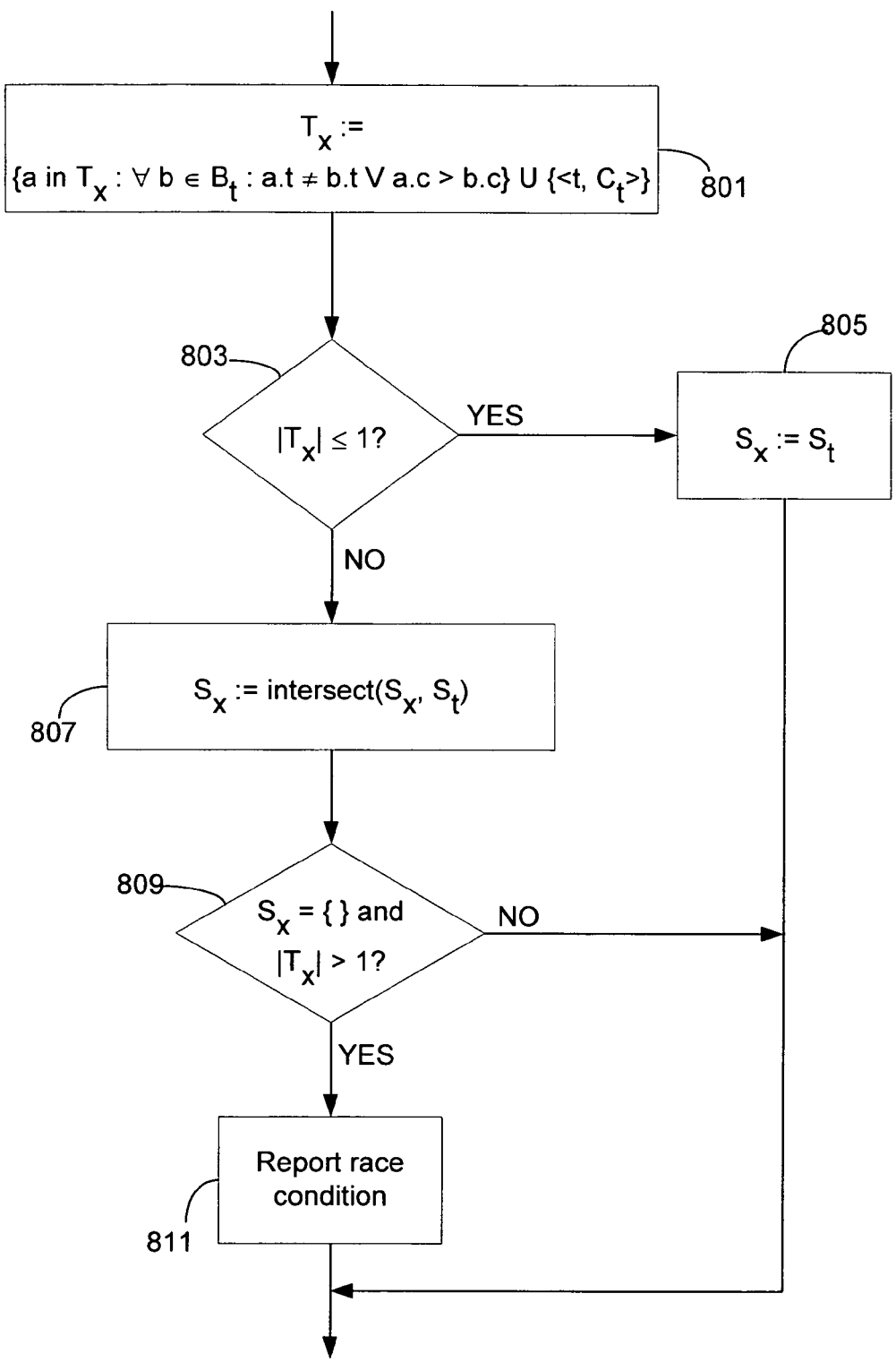
FIG. 8 is a flowchart showing steps associated with a read or a write of a memory location in accordance with an embodiment of the invention.

The flowchart of FIG. 8 shows steps taken when a read or a write of location x is executed by thread t. At step 801 the new value of set $T_x$ is computed, representing the thread segments concurrently accessing location x after the read or write. The second part of the union forming the new $T_x$ is the set containing t's current thread segment $<t, C_t>$. Since thread t is reading or writing x, clearly t is one of the threads that should be in the set $T_x$. The first part of the union represents a subset of the old value of set $T_x$ in which any thread that is no longer concurrently accessing the location is filtered out. At step 803 it is determined whether the cardinality of the new $T_x$ is less than or equal to 1. If so, there is at most one thread currently accessing x. The new value of $S_x$ then becomes the current value of the lockset $S_t$ (step 805). Otherwise, at step 807, there are multiple concurrent threads accessing x, and the new value of $S_x$ becomes the set comprising the intersection of the old value of $S_x$ and $S_t$. At step 809 it is determined whether (a) the new value of $S_x$ is empty and (b) the cardinality of the new value of $T_x$ is greater than 1. If so, at step 811 a potential race condition is reported.

Figure 9:
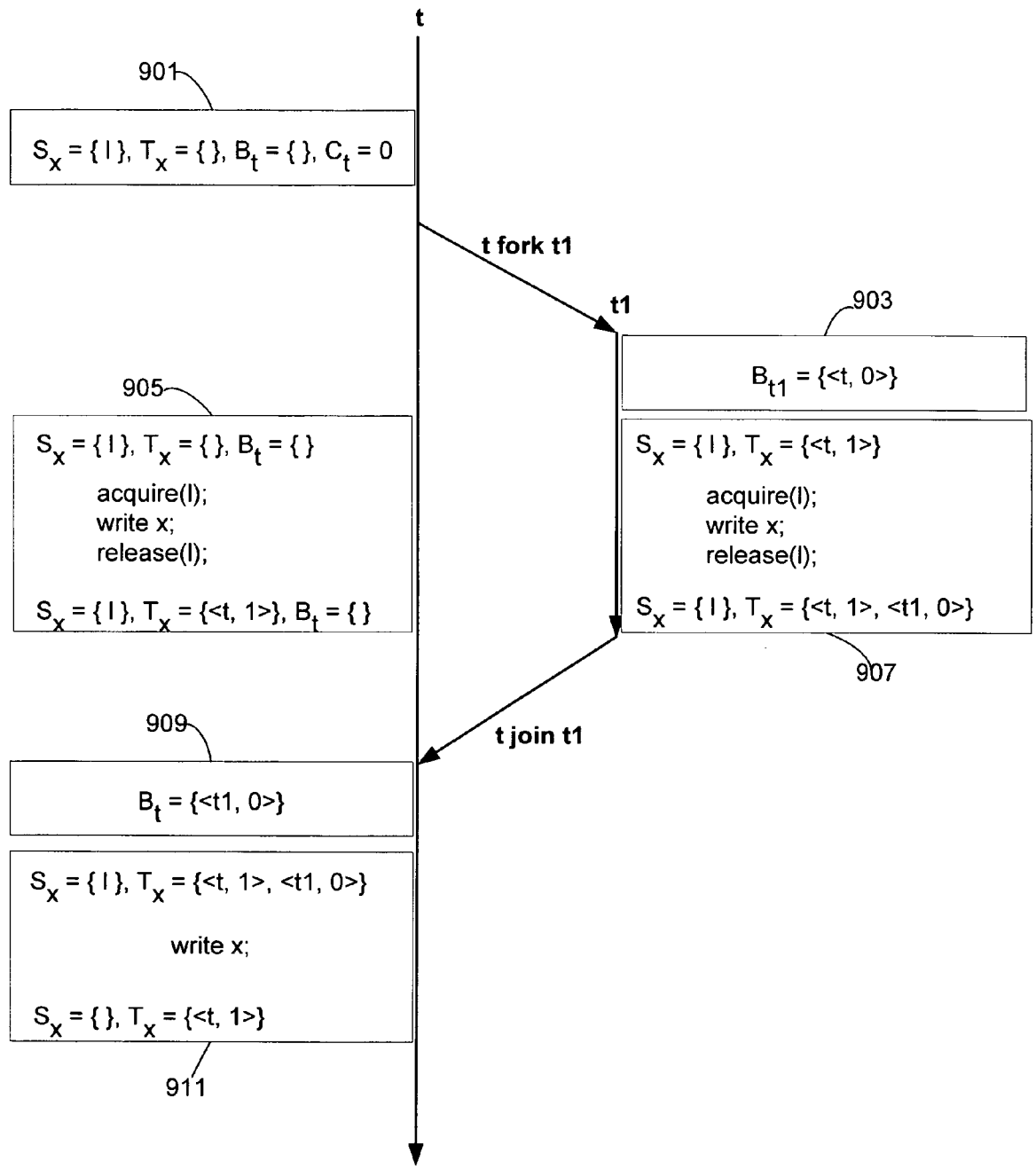
FIG. 9 is a diagram representing the operation of a thread performing a fork and join, in which a race condition is correctly not reported for a single-threaded access of a memory location, in accordance with an embodiment of the invention.

Turning now to FIG. 9, a diagram of a fork and join similar to FIG. 5 is shown, but in which race detection follows the approach of the present invention. Let us assume that, at the start of the execution (block 901), the sets $T_x$ and $B_t$ are empty, and $S_x$ is the singleton set containing the lock l. Suppose that block 905 is executed before block 907.

After the execution of block 905, $S_x$ is the set containing l, and $T_x$ is set containing the thread segment <t, 1>. After the execution of block 907, $S_x$ remains the same, but $T_x$ now contains two thread segments <t, 1> and <t1, 0>. Following the join at block 909, $B_t$ becomes the set containing the thread segment <t1, 0>. Before the write of x by t, at block 911, $S_x$ is the set containing l, and $T_x$ is still the set containing the two thread segments <t, 1> and <t1, 0>. Following the write, $S_x$ becomes empty, and $T_x$ becomes the set containing the thread segment <t, 1>(t is the only thread that is concurrently accessing x). Since the cardinality of $T_x$ is 1, a race condition is, correctly, not reported in accordance with the present invention.

In the prior art, there are two widely used approaches in implementing the kind of race detector included in embodiments of the present invention as described in this specification. The first approach is to insert calls for the memory accesses at the source code or byte code level. The second approach is to insert calls for load and store instructions in the native code. The previous approaches make the race detection tool tedious to run when there are a large number of shared libraries to be dynamically linked in, and, more significantly, this normally entails high runtime cost. In certain embodiments of the present invention, the dynamic race detector is instead implemented within a runtime system.

In one embodiment, the race detector is implemented within the Common Language Runtime of the .NET framework of Microsoft Corporation. The JIT (Just-In-Time) compiler, which compiles byte code to native code, is modified so that when code is dynamically loaded and compiled, calls to the race detector are inserted. The mechanism for allocating shared memory objects is modified so that the allocation adds on to the object the instrumentation information needed for the race detector; the information is then automatically managed by the runtime's garbage collector.

This implementation approach has a number of advantages over previous techniques. First, all the code being executed is dynamically instrumented. Second, modifying the JIT rather than the byte code avoids certain problems with the byte code verification phase. Third, having the JIT insert calls to the race detector permits the use of information gathered by the compiler to optimize the instrumentation. For example, the compiler may determine that instrumentation is not necessary, as for example if the compiler determines that a field is declared read-only or is local to a particular thread and invisible to other threads. Fourth, the race detector interacts well with the garbage collector, instrumenting only the shared objects on the managed heap and preventing potential memory leak problems caused by the race detection instrumentation. Finally, the implementation provides a performance advantage in that it eliminates a level of indirection present in standard approaches to race detector implementation.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for dynamically detecting potential race conditions in a program having at least one thread and one or more shared memory locations, the system comprising:

a processor, wherein the processor is adapted to:
  initialize a virtual clock (C_t) respectively for each of the at least one thread;
  initialize a set of candidate locks for each of at least one shared memory location (S_x);
  initialize a set of locks (S_t) held for each of at least one thread;
  initialize a set of concurrent thread segments (T_x) accessing each of the at least one shared memory location;
  initialize an ordered set of thread segments (B_t) below a current thread, wherein the ordering is achieved using the virtual clock associated with each thread;
  upon detection of a fork of a new concurrent thread (t1) by a prior thread (t):
    increment the virtual clock associated with the prior thread (t);
    initialize the virtual clock associated with the new concurrent thread (t1);
    update the ordered set of thread segments (B_t) before the prior thread (t) by forming a union of a current ordered set for the prior thread (t) and a singleton set having a thread segment <t, C_t>comprising a tuple of a thread identifier and a virtual clock time;
  upon detection of a join call by the prior thread (t):
    update the ordered set of thread segments (B_t) by forming a union of the ordered set of thread segments (B_t), a second ordered set of thread segments (B_t1) before thread (t1) that do not belong to the prior thread (t), and a singleton set containing a current thread segment associated with the current thread (t1); and
  upon detection of a read or write to a memory location (x), determining
  upon detection of a read or write to a memory location (x), determining whether a potential race condition exists by updating a set of concurrent thread segments concurrently accessing the memory location (T_x) after the read or write using the updated ordered set of thread segments (B_t) from the detection of the fork or join call.

2. The system of claim 1 wherein the processor is further adapted to:
if a cardinality of the set of concurrent thread segments (T_x) is less than or greater than 1, set a current value of a lockset (S_t) to a current value of the set of candidate locks for the memory location (S_x);
if the cardinality of the set of concurrent thread segments is greater than 1, set a new value of the set of candidate locks for the memory location (S_x) to an intersection of a prior value of the set of candidate locks for the memory location (S_x) and the lockset (S_t);
if the set of candidate locks (S_x) is empty and a new value of cardinality of the set of concurrent thread segments (T_x) is greater than 1, reporting a potential race condition.

3. A method for dynamically detecting potential race conditions in a program having at least one thread and one or more shared memory locations, the method comprising:
initialize a virtual clock (C_t) respectively for each of the at least one thread;
initialize a set of candidate locks for each of at least one shared memory location (S_x);
initialize a set of locks (S_t) held for each of at least one thread;
initialize a set of concurrent thread segments (T_x) accessing each of the at least one shared memory location;
initialize an ordered set of thread segments (B_t) below a current thread, wherein the ordering is achieved using the virtual clock associated with each thread;
upon detection of a fork of a new concurrent thread (t1) by a prior thread (t):
increment the virtual clock associated with the prior thread (t);
initialize the virtual clock associated with the new concurrent thread (t1);
update the ordered set of thread segments (B_t) before the prior thread (t) by forming a union of a current ordered set for the prior thread (t) and a singleton set having a thread segment <t C_t> comprising a tuple of a thread identifier and a virtual clock time;
upon detection of a join call by the prior thread (t):
update the ordered set of thread segments (B_t) by forming a union of the ordered set of thread segments (B_t), a second ordered set of thread segments (B_t1) before thread (t1) that do not belong to the prior thread (t), and a singleton set containing a current thread segment associated with the current thread (t1);
upon detection of a read or write to a memory location (x), determining whether a potential race condition exists by updating a set of concurrent thread segments concurrently accessing the memory location (T_x) after the read or write using the updated ordered set of thread segments (B_t) from the detection of the fork or join call; and
outputting a result of race condition determination to the user.

4. The method of claim 3 further comprising:
if a cardinality of the set of concurrent thread segments (T_x) is less than or greater than 1, set a current value of a lockset (S_t) to a current value of the set of candidate locks for the memory location (S_x);
if the cardinality of the set of concurrent thread segments is greater than 1, set a new value of the set of candidate locks for the memory location (S_x) to an intersection of a prior value of the set of candidate locks for the memory location (S_x) and the lockset (S_t);
if the set of candidate locks (S_x) is empty and a new value of cardinality of the set of concurrent thread segments (T_x) is greater than 1, reporting a potential race condition.

5. A computer readable medium having stored thereon computer executable instructions for dynamically detecting potential race conditions in a program having at least one thread and one or more shared memory locations, the instructions comprising:
initialize a virtual clock (C_t) respectively for each of the at least one thread;
initialize a set of candidate locks for each of at least one shared memory location (S_x);
initialize a set of locks (S_t) held for each of at least one thread;
initialize a set of concurrent thread segments (T_x) accessing each of the at least one shared memory location;
initialize an ordered set of thread segments (B_t) below a current thread, wherein the ordering is achieved using the virtual clock associated with each thread;
upon detection of a fork of a new concurrent thread (t1) by a prior thread (t):
increment the virtual clock associated with the prior thread (t);
initialize the virtual clock associated with the new concurrent thread (t1);
update the ordered set of thread segments (B_t) before the prior thread (t) by forming a union of a current ordered set for the prior thread (t) and a singleton set having a thread segment <t C_t> comprising a tuple of a thread identifier and a virtual clock time;
upon detection of a join call by the prior thread (t):
update the ordered set of thread segments (B_t) by forming a union of the ordered set of thread segments (B_t), a second ordered set of thread segments (B_t1) before thread (t1) that do not belong to the prior thread (t), and a singleton set containing a current thread segment associated with the current thread (t1);
upon detection of a read or write to a memory location (x), determining whether a potential race condition exists by updating a set of concurrent thread segments concurrently accessing the memory location (T_x) after the read or write using the updated ordered set of thread segments (B_t) from the detection of the fork or join call; and
outputting a result of race condition determination to the user.

6. The method of claim 5 wherein the instructions further comprise:
if a cardinality of the set of concurrent thread segments (T_x) is less than or greater than 1, set a current value of a lockset (S_t) to a current value of the set of candidate locks for the memory location (S_x);
if the cardinality of the set of concurrent thread segments is greater than 1, set a new value of the set of candidate locks for the memory location (S_x) to an intersection of a prior value of the set of candidate locks for the memory location (S_x) and the lockset (S_t);
if the set of candidate locks (S_x) is empty and a new value of cardinality of the set of concurrent thread segments (T_x) is greater than 1, reporting a potential race condition.

* * * * *